March 18, 1924.
F. H. LANDRUM ET AL
STERILIZATION OF ORGANIC MATERIAL
Filed Feb. 21, 1917   2 Sheets-Sheet 2
1,487,169
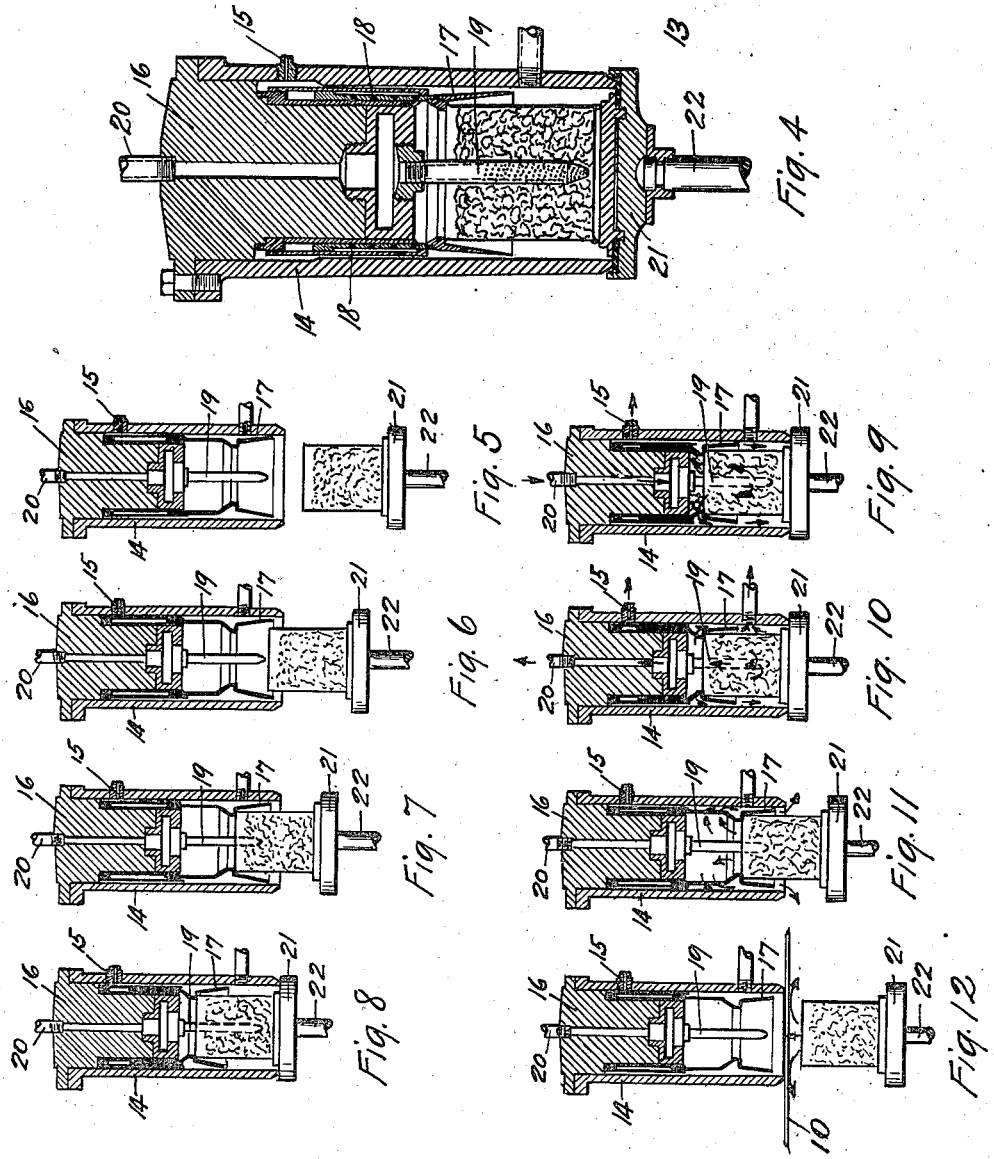

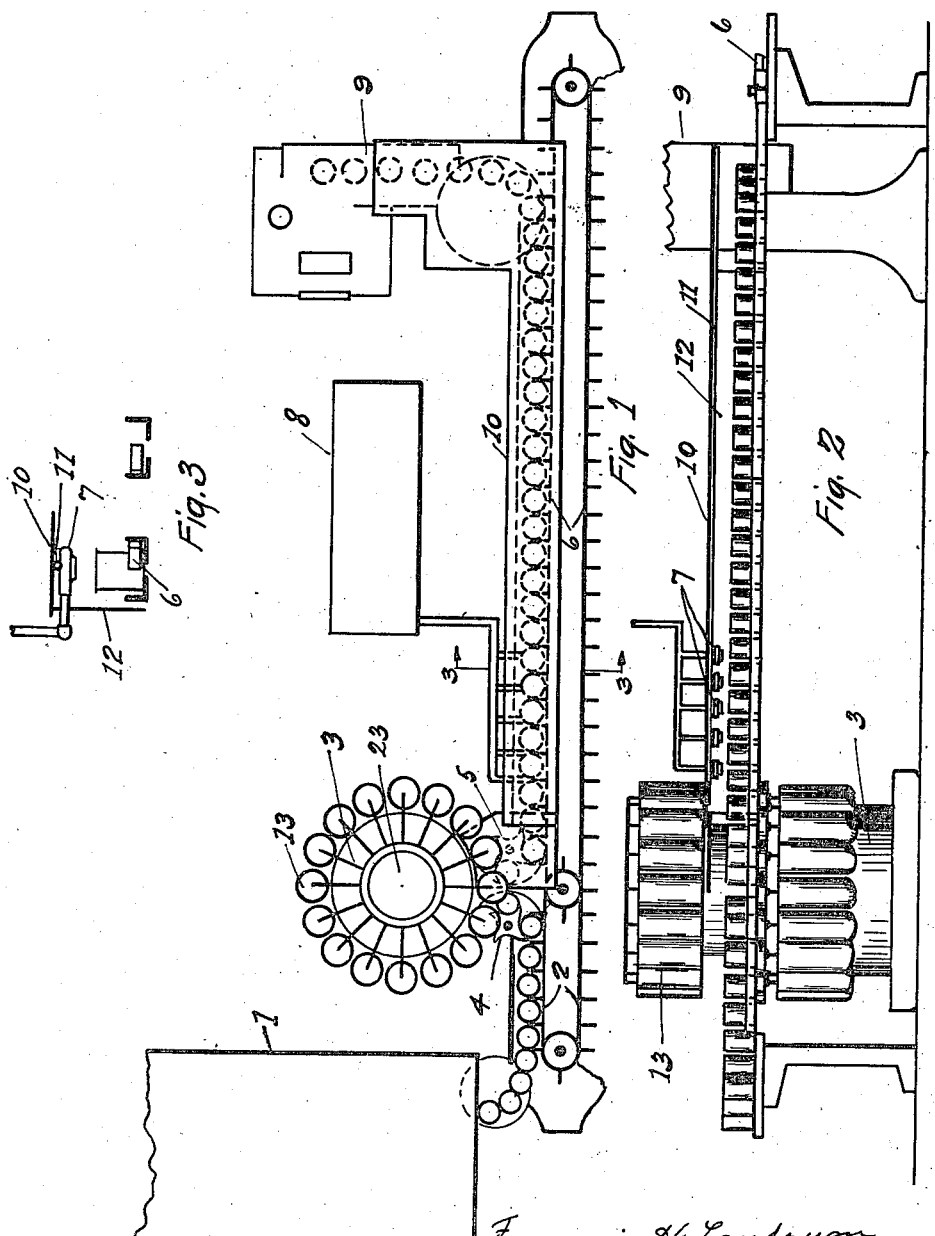

Patented Mar. 18, 1924.

1,487,169

UNITED STATES PATENT OFFICE.

FRANCIS H. LANDRUM AND ALBERT N. CRAMER, OF COLUMBUS, OHIO, ASSIGNORS TO THE WEDOIT COMPANY, OF COLUMBUS, OHIO.

STERILIZATION OF ORGANIC MATERIAL.

Application filed February 21, 1917. Serial No. 149,987.

*To all whom it may concern:*

Be it known that we, FRANCIS H. LANDRUM and ALBERT N. CRAMER, citizens of the United States of America, residing at Columbus, in the county of Franklin and State of Ohio, have invented certain new and useful Improvements in Sterilization of Organic Material, of which the following is a specification.

Our invention relates to the sterilization of organic material and has to do with the treatment of products that are to be offered to the public in sealed receptacles, such as canned goods. Our method and apparatus are peculiarly suited to the treatment of products having a mass or solid formation, such as fruits or vegetables, although many phases of improvement may be applicable to liquids. Furthermore, we have found it extremely desirable to apply our method to the treatment of the products in the vessels which are to go to the consumer, although it will become evident in the course of this description that our method is not necessarily limited to treatment of the product in the vessels which ultimately reach the consumer.

At one time, the theory prevailed that sterility of packaged products resulted from the absence of air from the receptacle holding the product. Also it was generally thought that all bacteria would succumb to the temperature of boiling water. However time and experiment have authoritatively proven the fallacy of these theories. And now the two accepted methods are the use of chemicals such as formaldehyde, at present under the ban of the law, and the use of a high degree of heat.

The use of a high degree of heat is the chief reliance in the art today and the only processes known by us to be in use commercially today in this country, excepting our process, are those in which the sealed vessels containing the product are placed in a heating retort and subjected to high degrees of heat. Necessarily the heat is externally applied and the time period required is so long that the vessels cannot, to advantage, be continuously passed through the treatment to which they must be subjected.

With the products that are more resistant to sterilization, each vessel must be subjected to an intense heat for approximately fifty minutes. The heat must be conducted to the center of each vessel from its outside and must be maintained at this center for a definite and material time. The time required for conducting the heat from the exterior to the center of each vessel, is longer than the time this degree of heat must be maintained to effect sterilization. The method is obviously absurdly indirect and, in spite of the previous filling of the vessel with liquid to avoid scorching of the product and to conduct the heat more readily to the centers of the vessels, there necessarily results a longer application of heat to the product at the sides of the vessel than to the product at the center of such vessels. One result is that it is impossible to properly sterilize the product at the centers of the vessels without cooking the product at their sides. Furthermore, more time is lost in attaining the proper temperature at the center than is required to sterilize.

The result is both a scorching and overcooking of the product at the sides of the vessel and, what is equally important, a great expenditure of time which is totally wasted since it is not devoted to sterilizing but simply to attaining a sterilizing heat.

Recent developments in this method of sterilizing by heat applied to the exteriors of the vessels have taken the form of the mechanical agitation of the sealed vessels during treatment so as to more quickly conduct the heat units to those portions of the product that were originally at the centers of the vessels but which will probably be shifted due to this agitation.

The time period for complete sterilization has been slightly decreased in this manner; but the agitation of these cans mechanically and the resultant shifting of the whole body of the product in each vessel has had a tendency to mutilate the more delicate products. The decrease in the time period requisite for sterilization has been comparatively slight and has not in any material measure modified the defect of cooking and over-cooking the product.

The importance of our improvement is best made evident by calling attention to the fact that prior methods demand a thirty minute period for the treatment of peaches, for example. By our method, we have time and again sterilized peaches in ten seconds. Not only this, but the peaches sterilized by us were uncooked, a phenomenon hitherto unknown in the art of sterilizing.

Our improved method is a complete departure from the idea of applying a sterilized heat after the product has been sealed in the cans. We have abandoned this essential of the old method; for we apply the treating medium directly to the product and preferably at its center. In order to accomplish this, our method preferably contemplates the use of apparatus which receives the vessels containing the product and without the caps. This apparatus simultaneously moves and sterilizes each vessel and its contents by the direct introduction of a treating medium, preferably by nozzles projected into each can. The result is that there is no delay in reaching the centers of the product in each vessel; nor, in fact, is there any delay in reaching all portions of the product in the vessel. Many important advantages result from this, such as relief from the comparatively long and intense heat at the sides of the can, the great saving of time due to the practically uniform and immediate permeation of the heat units to all portions of the product and to the inner surfaces of the vessel, the ready expulsion of the air from the vessel and sterilizing chamber which results in a saving of time, the retention of natural flavors and the obviation, if desired, of cooking of the product.

Prior methods have contemplated the use of a liquid in the can during sterilization, generally for the purpose of saving time. Our method contemplates the elimination of liquids, except such as are introduced with the treating medium, to save time. The inherent qualities of our treating medium are such that scorching cannot result and it is, therefore unnecessary to maintain a liquid in the vessel to guard against this.

Our invention is also a radical departure from all prior methods in that we pass an open vessel through a machine and introduce a treating medium while it is so passing and, then, we permit this movement to continue without cessation to closing apparatus but under positive protection against re-infection. As far as our knowledge extends no one has ever considered it possible to sterilize a product in an open vessel and then move that open vessel to another point for sealing without re-infection. This is one of the reasons that no one has ever considered it feasible to sterilize solids in open vessels on a commercial scale; although there are many other apparent barriers which we have overcome.

Our invention further contemplates the application of a liquid to the product within the vessels after the sterilization of the interior and adjacent surfaces of the vessel, the sterilization of the product and the sterilization of the liquid to be applied. The application of this liquid before sterilization is undesirable but, its application after sterilization is important for then it may be used to flavor the product, to regulate the vacuum which must ultimately arise after the vessel has been sealed, and to support the product in future shipment. Its presence may also be important if subsequent treatment of the sealed vessel in a heating retort should be desirable. Such treatment is sometimes advantageous in certain classes of vegetables which are not readily sterilized or which require a greater cooking than the ordinarily slight cooking which results from our direct treatment.

In addition, our invention contemplates the application of a sterilizing medium or element to the interior surfaces of the caps which are to be applied to the vessels. This is an important feature in the prevention of re-infection of the product in the vessel.

Our invention is particularly applicable to treatment of the product in the vessel which is to go to the consumer and to the continuous passage of these vessels through a series of treatments. We have devised apparatus which receives a stream of open vessels containing the material to be sterilized and conducts this stream through apparatus for injecting sterilizing steam into each vessel, through a means for feeding a sterile liquid to each can and through a means for closing each can with a previously sterilized cap, each can having been fully protected throughout from re-infection by the combination of rising heat currents therefrom and cover plate structure.

The apparatus preferably used in performing our method is illustrated in the accompanying drawings, wherein similar characters of reference designate corresponding parts, and wherein—

Figure 1 is a top plan view of the apparatus.

Figure 2 is a side elevation of the apparatus shown in Figure 1.

Figure 3 is a section taken on line 3—3 of Figure 1.

Figure 4 is a vertical section of one of the receiver elements forming a part of the principal unit of our apparatus.

Figures 5 to 12 inclusive illustrate the successive positions of the parts of the receiver element shown in Figure 4 from the time a vessel containing material to be sterilized is delivered to it.

In the operation of our method, the product is preferably placed in the vessels which are to go to the consumer. These vessels containing the product but without any added liquid may be passed, while still open, through an exhaust box 1, which effects a preliminary heating. The exhaust box is desirably of a construction to receive and treat a continuous stream of vessels which are then passed on to a conveyor 2 for feeding the open vessels to a sterilizer 3. This conveyor 2 is preferably constructed with a base plate along which the vessels are adapted to slide and to be propelled by the laterally extending arms of the conveyor chain. They are retained between these arms by a vertical guide plate and are finally delivered to the sterilizer 3 by a star wheel 4.

The sterilizer 3 receives each vessel and temporarily covers its open end in a manner to be described in detail later on in this specification. This sterilizer is a turret-type machine and, upon receipt of each vessel, this vessel is carried in a rotary path and subjected to a series of operations which will likewise be subsequently described. The vessel is finally delivered from the sterilizer 3 by means of a star wheel 5 to another conveyor 6 which conducts this vessel and successive ones beneath a series of discharge valves 7 for supplying a previously sterilized liquid from sterilizing apparatus 8 to the vessels. These vessels then pass to a closing apparatus of a structure to supply sterilized caps and apply them to the vessels as they are presented. This closing apparatus may be broadly designated 9.

One of the most important features of our invention is yet to be described. It is a comparatively simple element; but it is of utmost importance and it is doubtful if success can be had without its use, although this is true of many other novel features of our improvement. The element in question is designated 10 and may be termed a cover plate. It is a long horizontal plate which extends so close to the sterilizer 3 that it overlaps the open vessels as they are being delivered from the sterilizer. At its other end it overlaps the vessel closing apparatus and it is desirably continuous throughout. When steam is used in the sterilizer, as under preferred conditions, the vessels issue therefrom emitting rising heat currents. These upward drafts tend of their own action to prevent reinfection of the open vessels and their contents by bacteria or by bacteria-laden particles, but long trial and many experiments have demonstrated that a cover plate such as 10 is practically necessary to guard against re-infection. This cover plate 10 is preferably heated by a steam pipe 11 shown disposed along and adjacent its under surface. It will be noted that the cover plate extends immediately above the discharge valves 7. It is still more important to note that the shape and location of this cover plate is such that, though not engaging the travelling vessels, it is at all times above their open ends. Supplemental to the cover plate 10 is a vertical rear guard plate 12 placed adjacent the path of travel of the vessels to discourage lateral drafts across the open ends of these vessels.

The principal unit of the sterilizer 3 is designated 13 and it comprises a bell-shaped receiver 14 having a bleed hole 15 in its upper end, an interior solid portion 16 and a gravity centering sleeve 17 provided with several series of ports 18. This solid portion 16 carries a nozzle 19 fed by a pipe 20. The lower end of the receiver 14 is open when in inoperative position but is designed to be closed by the elevating table 21 which first receives the open vessel containing the material to be treated and then raises it into the interior of the bell-shaped receiver 14. The operation may be traced as follows:

The open vessel is delivered to the table 21 by the conveyor 2 and star wheel 4 and when first delivered, it and the parts of the unit 13 are in the position shown in Figure 5. The table 21 is designed to be elevated by steam operating upon a plunger connected to the stem 22, this steam being under the control of a main central valve roughly illustrated at 23 in Figure 1. The first upward movement of the table 21 results in a centering of the vessel before the nozzle 19 is projected into it. This centering action is illustrated in Figure 6. This upward movement continues as indicated in Figures 7 and 8 and in its course a portion of the air is ejected through the ports 18 until the gravity centering sleeve 17 is sufficiently raised to cut off the ports. Finally, the table 21 abuts and resiliently seals the lower end of the bell shaped receiver. At this time, the parts are in the position shown in Figures 8 and 9 and the receiver is pressure-tight while the open end of the vessel is enclosed. Then, the steam is automatically introduced through the nozzle 19 as the central valve assumes a relative position to permit this and this steam is delivered into the vessel close to its bottom as well as at various heights therein. It immediately permeates all of the interstices of the product in the vessel and is preferably so handled as to bring about a gentle agitation of the units of the product. Practically simultaneously, part of the steam passes up around the edges of the vessel and part through the ports 18 as well as through the slight clearances of the slide-way for the centering sleeve until it reaches the space around the vessel and serves to brace it against internal pressure tending to burst such vessel. The steam thus delivered to the interior of the vessel and also to the exterior thereof is of a sterilizing temperature. After the sterilizing action is complete, which occurs with most products in the course of one revolution of the turret, the steam is exhausted from the receiver as indicated in Figure 10. Then the table 21 is lowered, being followed down by the sleeve 17 until the ports 18 have been uncovered and more thoroughly dissipate the pressure within and above the vessel. This is important to avoid "spit-out" from the vessel when it is finally dropped below the lowest position of said sleeve. This final position is illustrated in Figure 12 and is practically identical with the showing in Figure 5, except that it discloses arrows which indicate heat currents arising from the open vessel of sterilized material.

It will be noted that this vessel containing the material to be sterilized has been covered throughout this sterilizing operation. Immediately upon the assumption of the position shown in Figure 12 and before its engagement by the delivery star wheel 5, it passes under the cover plate 10 while the receiver 14 passes over this cover plate.

Attention is again called to the fact that, until the time of this delivery to the passage beneath the cover plate 10, the material within the open vessel has been practically dry with the exception of the fluid forming the sterilizing medium. This open vessel with its rising heat currents passes along beneath the cover plate 10 and under subjection to the discharge valves 7. These discharge valves 7 are fed with sterile liquid, preferably brine or syrup from a liquid sterilizer and cooler 8. Thus, for the first time, the vessel is filled with a sterile liquid; or, in fact, this is the first time in the course of the process that the product within the vessel has been immersed in any liquid.

It is a notable characteristic of our process that we save time by treating the product with a directly applied treating medium and in the absence of any liquid. The processes in general use today require a liquid in the vessel in order to conduct the heat to its center. This is only one of the features in which our process is diametrically opposed to the other methods in commercial use.

We have not eliminated liquids from the vessel entirely because, after sterilization and while the open vessel is passing along beneath the cover plate, we have introduced sterile liquid and have developed certain novel functions by the introduction of liquid at this point. It is obvious that the open vessel at this stage possesses a heated interior. Experience has also demonstrated that it is desirable to have a definite vacuum in the vessel after sealing. We control the degree of this vacuum by introducing the sterile liquid at a predetermined temperature. The introduction of the liquid is further advantageous in that it enables us to flavor the product and also supports this product after closing of the vessels to avoid mutilation in shipping. It is further advantageous in the event that it could be desired to pass the vessel after closing through a heating retort for further treatment.

The open vessels with their rising heat currents then pass on beyond the discharge valve 7 and are finally delivered to the can closing and sealing mechanism 9. This can closing and sealing mechanism 9 will be illustrated in other applications to be filed by us but we have shown enough to make it apparent that the vessels are successively presented with caps which are then sealed in position thereon by a provided sealing machine. This sealing machine is of a special construction for it automatically sterilizes the caps, places them on their can and firmly seals them against leakage.

It will be apparent from this description that we have practically eliminated all of the roundabout features of sterilization. Realizing that the interior of the vessels and the caps and the contents of the vessels are the things demanding sterilization, we have gone directly to the heart of the problem by directly applying a sterilizing medium to these things. To accomplish this, we have preferred to treat the product in open vessels and in a comparatively dry state. Furthermore, we have arranged to simultaneously treat the interior surfaces of the vessels and to treat the interior surfaces and adjacent surfaces of the caps to be applied. We have ensured the efficiency of our method by the provision of protective means at every step. While saving time by treating the product and the vessel in a comparatively dry condition, we have nevertheless arranged to introduce a sterile liquid under novel conditions resulting in novel and important functions. We have contrived to expel the air from the vessels by the treating medium and have thus removed one influence which tends to delay sterilization. In addition, our method makes possible a gentle agitation so that all surfaces of the units of a solid product may be effectually treated, though the gentleness of this agitation and the comparatively short period of the treatment precludes any breaking down of the product as a result of this agitation.

It is important to note the immense saving of time resulting from our method in comparison with those methods wherein the product is treated in sealed vessels. In this latter process, the time consumed in attaining a sterilizing temperature at the center of the vessels alone amounts to between twenty and forty minutes. Then the actual time for sterilization will probably be from five to fifteen minutes. In our method, the total time required is approximately ten seconds. It is difficult to realize that so much time can be saved and yet proper sterilization be attained. Nevertheless our method and apparatus are in operation now and obtaining the results described.

Many other important advantages of our improvement might be set forth in this specification but are being omitted in the interests of brevity.

Having thus described our invention, what we claim is:

1. Sterilizing apparatus comprising means for passing organic material in an open vessel through sterilizing apparatus, means for applying a sterile liquid to such vessel, means for applying a sterile cover to such vessel, and an overhead cover plate for protecting such vessel in its passage from said sterilizing apparatus to said last means.

2. Sterilizing apparatus comprising means for passing organic material in an open vessel through sterilizing apparatus, a nozzle projecting into such vessel during such passage, closing means to apply a sterile cover and spaced in relation to said sterilizing apparatus, means for moving such vessel from said sterilizing apparatus to said closing means, and an overhead cover plate for protecting such vessel while under subjection to said last means.

3. Sterilizing apparatus comprising means for passing organic material in an open vessel through sterilizing apparatus, a nozzle projecting into such vessel during such passage, closing means to apply a sterile cover spaced in relation to said sterilizing apparatus, means for moving such vessel from said sterilizing apparatus to said closing means, an overhead cover plate, and a plate co-operating with said cover plate and angularly positioned thereto, said plate and said cover plate positioned to protect such vessel while under subjection to said last means.

In testimony whereof we, hereby affix our signatures.

FRANCIS H. LANDRUM.
ALBERT N. CRAMER.